United States Patent
Veikle et al.

(10) Patent No.: US 9,295,197 B1
(45) Date of Patent: Mar. 29, 2016

(54) COMBINE HARVESTER WITH BLOWER EQUIPPED ELEVATOR

(71) Applicant: CNH Industrial America LLC, New Holland, PA (US)

(72) Inventors: Eric E. Veikle, Lititz, PA (US); Martin J. Roberge, Saskatoon (CA); Curtis F. Hillen, Lititz, PA (US); Herbert M. Farley, Elizabethtown, PA (US); Frank R. G. Duquesne, Zwevegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/513,587

(22) Filed: Oct. 14, 2014

(51) Int. Cl.
*A01F 12/44* (2006.01)
*A01D 61/00* (2006.01)
*A01D 41/00* (2006.01)
*A01D 61/04* (2006.01)
*A01F 12/46* (2006.01)

(52) U.S. Cl.
CPC .............. *A01D 61/002* (2013.01); *A01D 41/00* (2013.01); *A01D 61/04* (2013.01); *A01F 12/46* (2013.01)

(58) Field of Classification Search
CPC .............. A01D 41/00; A01D 41/1276; A01D 41/1208; A01D 41/1217; A01D 61/002; A01D 61/04; A01F 12/48; A01F 12/52; A01F 12/46; A01F 12/444; A01F 12/442; A01F 12/446
USPC ......... 56/14.6, 51, 60; 209/26, 321, 395, 394, 209/139.1; 460/4, 13, 99–101, 114, 131, 460/102, 120–122
See application file for complete search history.

(56) References Cited

U.S. PATENT DOCUMENTS

| | | | |
|---|---|---|---|
| 1,562,946 A | 11/1925 | Dowdall | |
| 2,482,159 A | 9/1949 | Delivuk | |
| 3,116,236 A * | 12/1963 | Helmut | A01F 12/444 209/26 |
| 4,441,511 A | 4/1984 | Schroeder | |
| 4,784,755 A | 11/1988 | Taylor | |
| 6,390,915 B2 * | 5/2002 | Brantley | A01F 12/442 460/131 |
| 6,558,252 B2 * | 5/2003 | Visagie | A01F 12/444 460/100 |
| 7,399,223 B2 * | 7/2008 | Weichholdt | A01F 12/446 209/395 |
| 7,896,731 B2 * | 3/2011 | Schwinn | A01F 12/446 460/101 |
| 8,651,927 B1 | 2/2014 | Roberge et al. | |

FOREIGN PATENT DOCUMENTS

GB 650777 3/1951

* cited by examiner

*Primary Examiner* — Robert Pezzuto
(74) *Attorney, Agent, or Firm* — Patrick M. Sheldrake

(57) ABSTRACT

An agricultural harvester includes a chassis; at least one ground engaging traction member connected to the chassis; a cleaning system held by the chassis and configured to clean crop material; and an elevator supplied with the crop material cleaned by the cleaning system. The elevator includes a housing having a crop material inlet that receives the crop material, a boot portion that forms a bottom of the housing, an air inlet and an air outlet; a plurality of paddles configured to convey the crop material through the housing and away from the boot portion in a generally vertical direction; and a blower configured to produce a pressurized air stream through the air inlet that expels loose crop material into the air outlet as the crop material is conveyed away from the boot portion.

20 Claims, 9 Drawing Sheets

COMBINE HARVESTER WITH BLOWER EQUIPPED ELEVATOR

BACKGROUND OF THE INVENTION

1. Field of the Invention

The present invention relates to agricultural harvesters, and, more particularly, to agricultural harvesters with crop material elevators.

2. Description of the Related Art

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

The grain cleaning system is typically the bottleneck that limits the capacity of an agricultural harvester. The bottleneck results from the desire to effectively separate the grain from the MOG, which requires a sufficiently long travel of the grain and MOG along the sieves to separate the grain from the MOG. Simply speeding up the operation of the grain cleaning system is effective to increase capacity, but also increases the likelihood of MOG not being separated from the grain. While other efforts have improved the grain cleaning systems included on agricultural harvesters, the grain cleaning system remains the usual bottleneck limiting the agricultural harvester's capacity.

What is needed in the art is an agricultural harvester with an improved capacity.

SUMMARY OF THE INVENTION

The present invention provides an agricultural harvester with an elevator including a blower that can produce a pressurized air stream through an air inlet to expel loose crop material into an air outlet.

The invention in one form is directed to an agricultural harvester including: a chassis; at least one ground engaging traction member connected to the chassis; a cleaning system held by the chassis and configured to clean crop material; and an elevator supplied with the crop material cleaned by the cleaning system. The elevator includes a housing having a crop material inlet that receives the crop material, a boot portion that forms a bottom of the housing, an air inlet and an air outlet; a plurality of paddles configured to convey the crop material through the housing and away from the boot portion in a generally vertical direction; and a blower configured to produce a pressurized air stream through the air inlet that expels loose crop material into the air outlet as the crop material is conveyed away from the boot portion.

The invention in another form is directed to a crop material elevator including: a housing having a crop material inlet, a boot portion forming a bottom of the housing, a top, an air inlet and an air outlet; a driving loop held within the housing extends from the boot portion toward the top of the housing; a plurality of paddles connected to the driving loop and configured to convey crop material away from the boot portion toward the top of the housing; and a blower configured to produce a pressurized air stream through the air inlet that expels loose crop material into the air outlet as the crop material is conveyed away from the boot portion.

An advantage of the present invention is that it can increase the capacity of the agricultural harvester by removing MOG in the elevator.

Another advantage is that the elevator can remove MOG from the grain that might have made it through the grain cleaning system.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
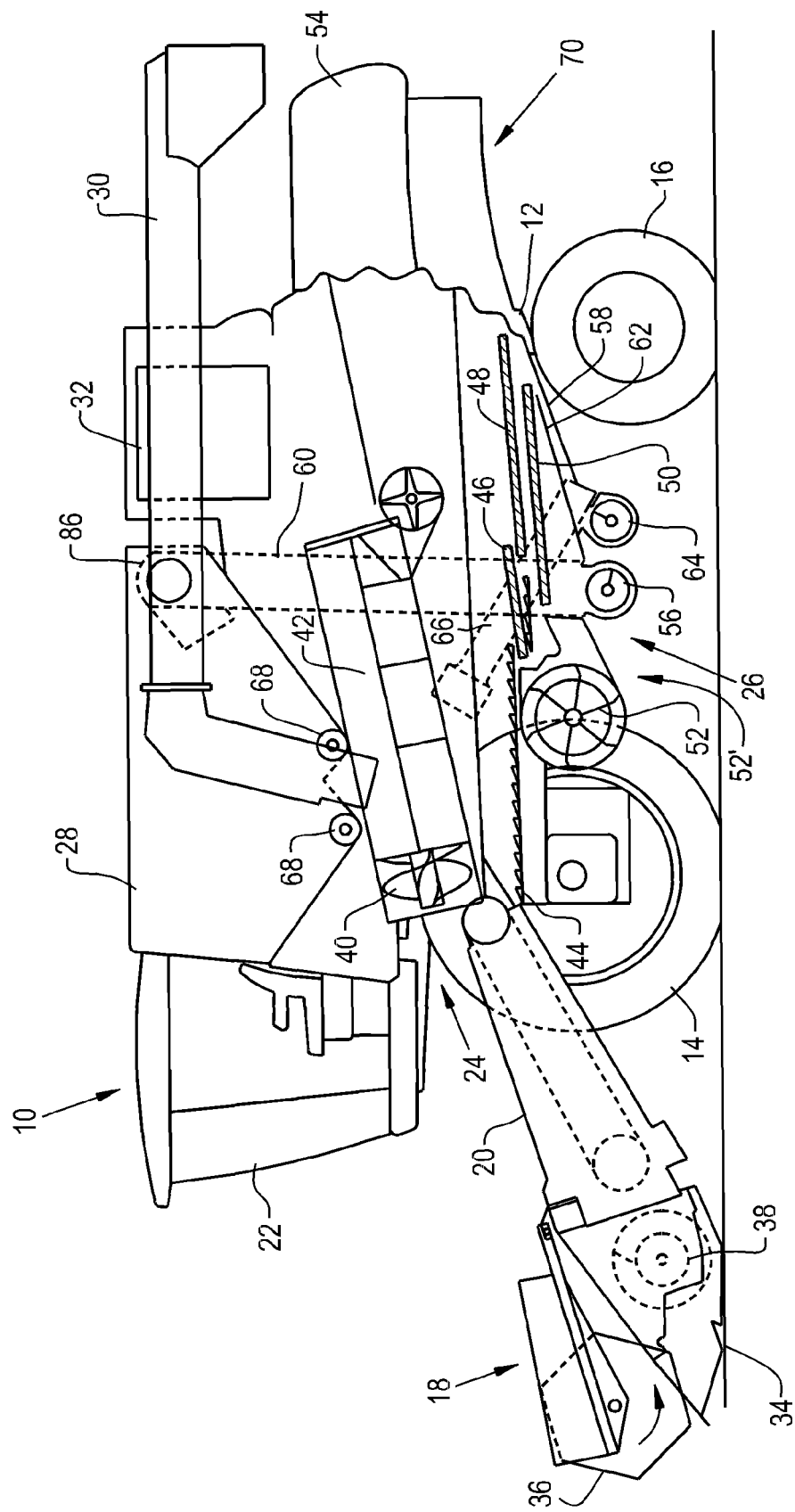
FIG. 1 is a perspective view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
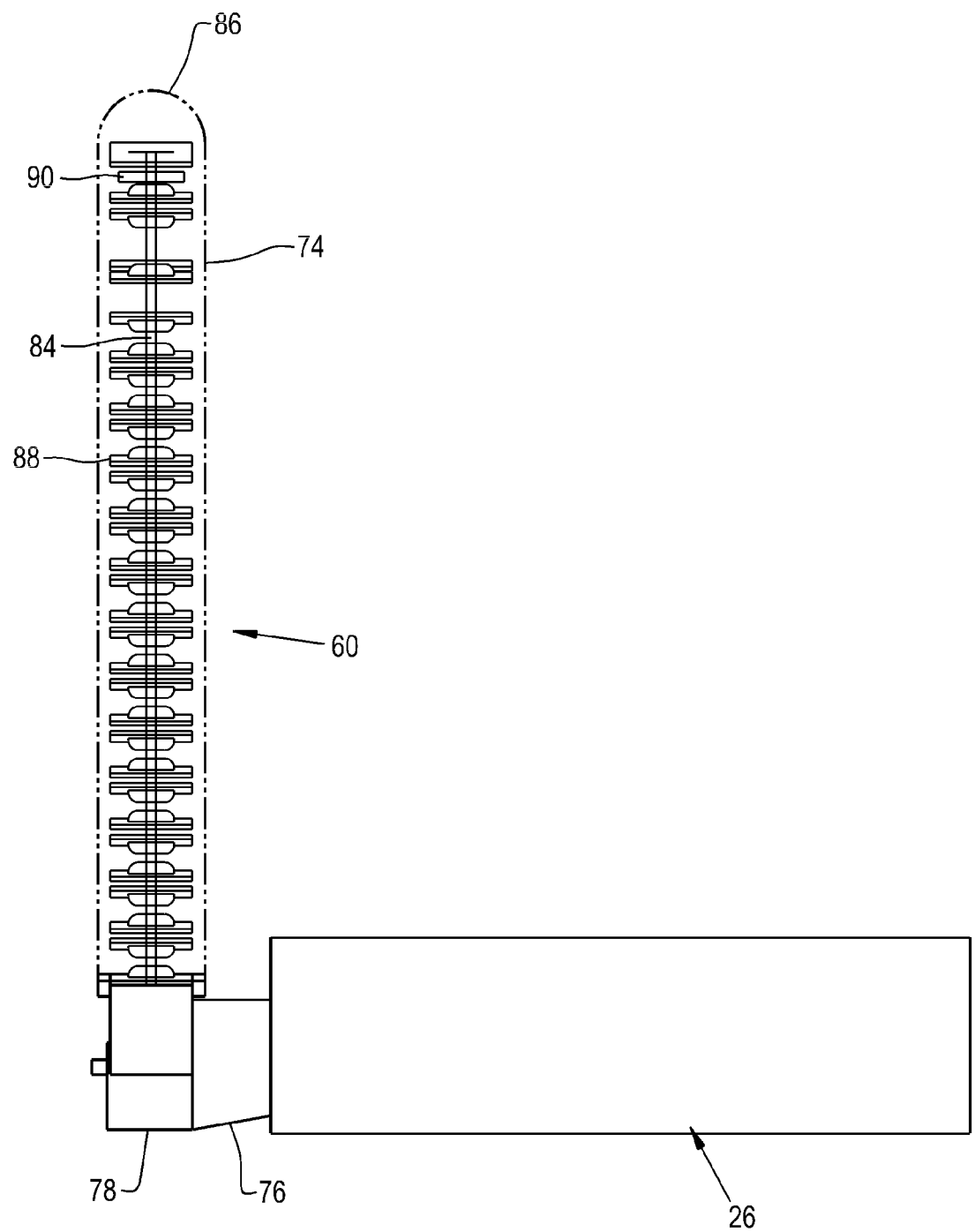
FIG. 2 is a cutaway perspective view of a portion of the agricultural harvester shown in FIG. 1, showing a portion of a cleaning system and elevator.

Referring now to FIG. 2, a portion of the agricultural harvester 10 with the cleaning system 26 and elevator 60 is shown in better detail. As can be seen, crop material is supplied to the elevator 60 through the cleaning system 26, which is shown generically as a block to illustrate that any sort and portion of a cleaning system could supply crop material to the elevator 60. When the cleaning system 26 shown in FIG. 1 supplies crop material to the elevator 60, the crop material can be supplied to the elevator 60 utilizing clean grain auger 56. It should be appreciated that the elevator 60 can be supplied with crop material from more than one auger or a mechanism besides an auger, depending on the configuration of the cleaning system.

Figure 3:
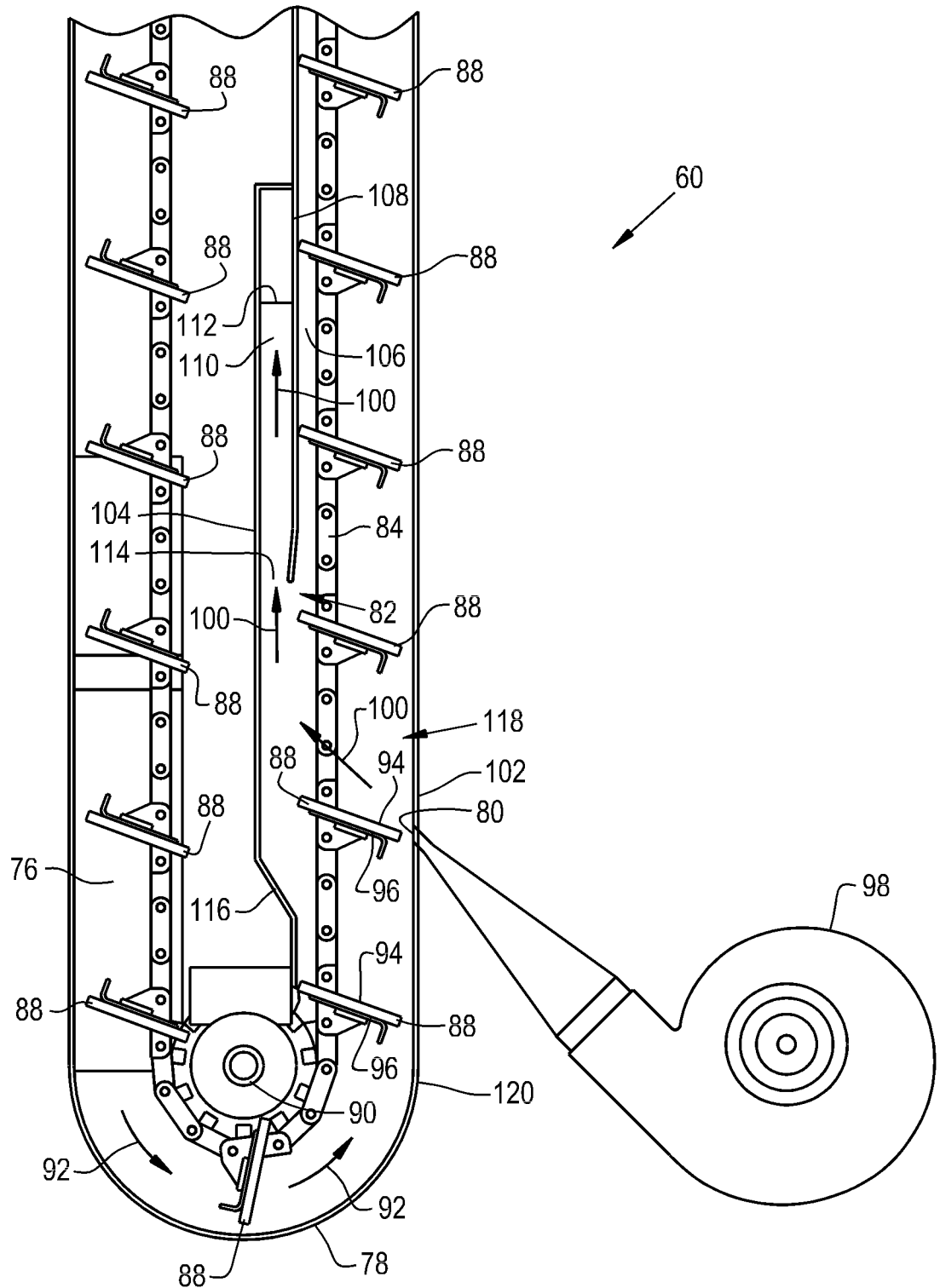
FIG. 3 is a sectional view of an embodiment of the elevator shown in FIG. 2.

Referring now to FIG. 3, the elevator 60 is shown in greater detail. As can be seen, the elevator 60 includes a housing 74 with a crop material inlet 76 supplied with clean grain from the cleaning system 26, a boot portion 78 that forms a bottom of the housing 74, an air inlet 80, and an air outlet 82. It should be understood that while clean grain is described as the crop material being transported through the elevator 60 when referencing FIGS. 3-9, other crop material such as tailings could also be transported through the elevator 60, or grain that is not acceptably clean due to high concentrations of MOG. It should also be understood that the elevator 60 can have any relative position to the cleaning system 26 that allows for crop material to be conveyed from the cleaning system 26 to the elevator 60. A driving loop 84, shown here as a drive chain, is held within the housing 74 and extends from the boot portion 78 of the housing 74 toward a top 86 (shown in FIGS. 1-2) of the housing 74. Although the driving loop 84 is shown as being a drive chain, which can also be referred to as an endless chain, the driving loop 84 could also be a belt, a cable, or other similar construction that forms a loop through the housing 74 and can be driven to rotate throughout the housing 74. Paddles 88 are connected to the driving loop 84, which can be driven by sprockets 90 to move the paddles 88 through the housing 74 along the driving loop 84 and convey clean grain from the crop material inlet 76 to the top 86 of the housing 74, where the crop material can be unloaded to the grain tank 28. As shown in FIG. 3, the paddles 88 rotate about the lower sprocket 90 in a counter-clockwise direction, indicated by arrow 92. In this sense, the paddles 88 each have a leading edge 94 which the crop material will rest on during vertical transport up the elevator 60 and a lagging edge 96 that is a bottom of the paddles 88 and will be discussed further below. A blower 98, shown here as a fan, is connected to the air inlet 80 and produces a pressurized air stream, represented as arrow 100, that will be discussed further below. While the blower 98 is shown as a fan, the blower 98 could be configured as any construction capable of producing a pressurized air stream that has sufficient force to move loose particles. Such a configuration could also be, for example, a nozzle controlled by a solenoid and linked to an air compressor, as described in U.S. Pat. No. 8,651,927, that can provide pulses of pressurized air.

Figure 4:
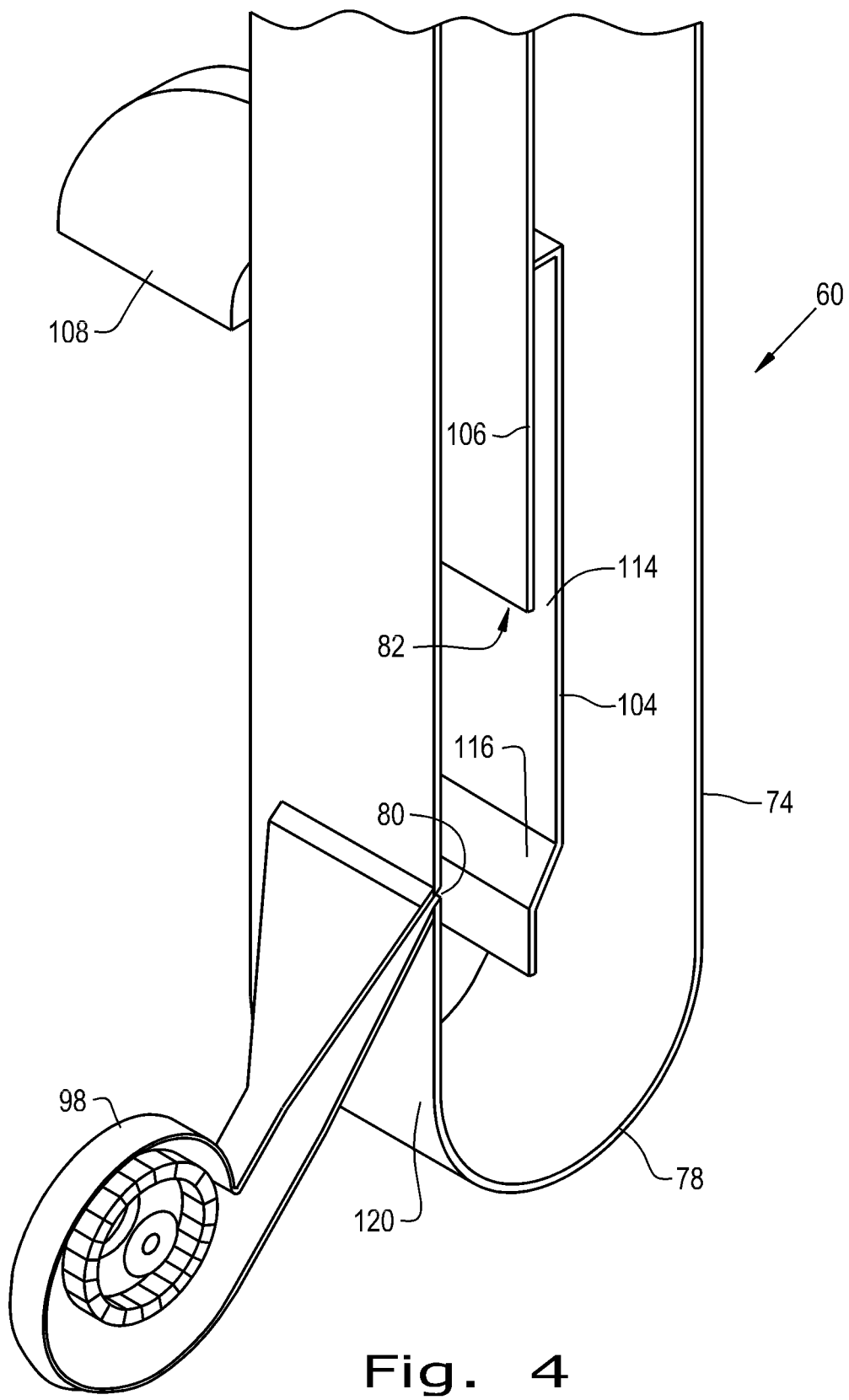
FIG. 4 is a cutaway perspective view of a housing and blower of the elevator shown in FIGS. 2-3.
Figure 5:
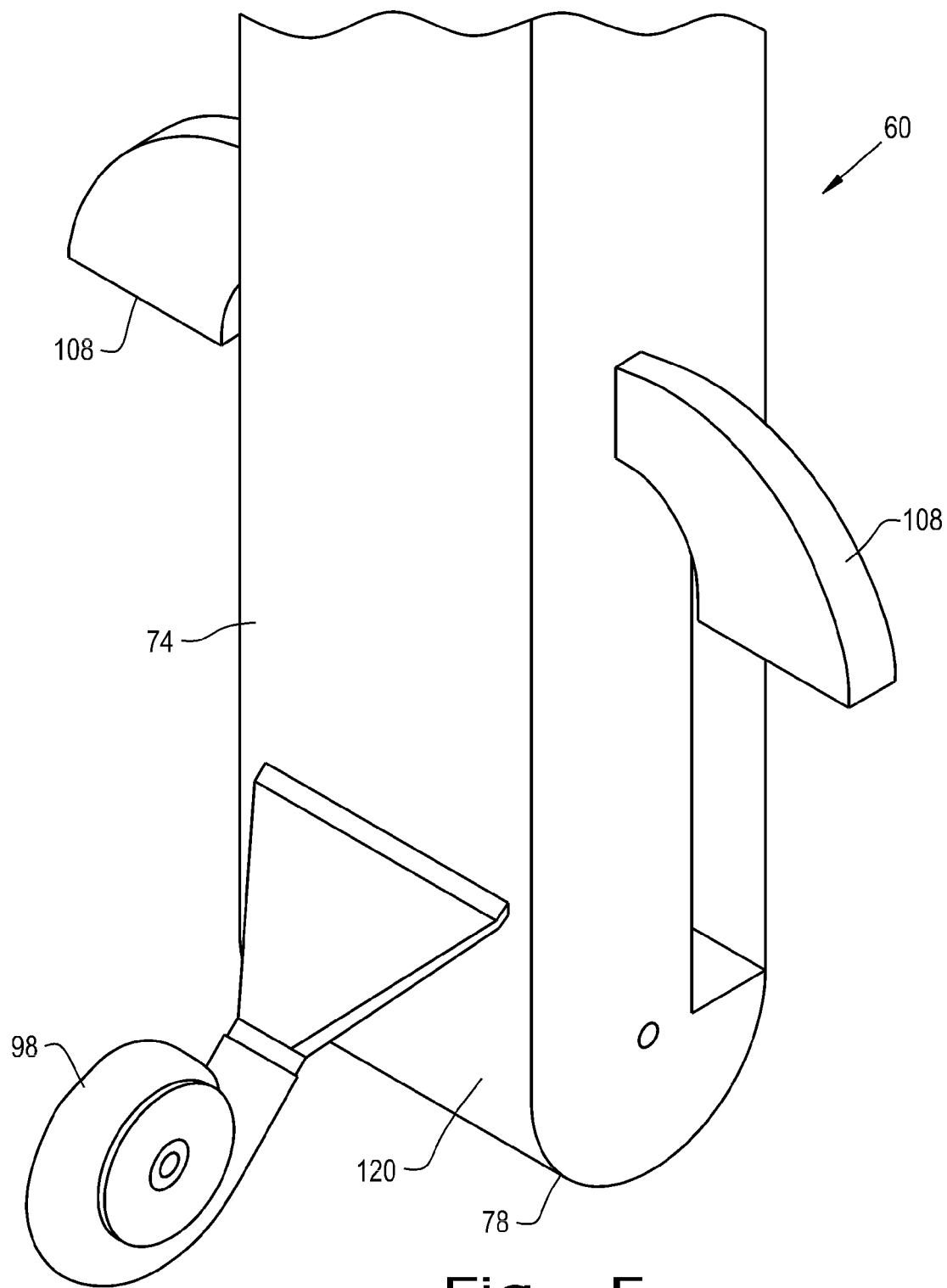
FIG. 5 is a perspective view of the elevator shown in FIGS. 2-4.

As shown in FIGS. 3-4, the housing 74 has a mostly rectangular cross-section, except for the boot portion 78 forming the bottom of the housing 74, which has a semi-circular shape. The boot portion 78 has a semi-circular shape to allow for paddles 88 to rotate about the sprocket 90 near the bottom of the housing 74 and transition from a vertical descent down the elevator 60 toward the boot portion 78 into a vertical ascent up the elevator 60 away from the boot portion 78 and toward the top 86 of the housing 74. The air inlet 80 can be formed on an exterior surface 102 of the housing 74 so that air being pulled into the elevator 60 by the blower 98 does not contain MOG or other particles that have already been expelled from the harvester 10. While the air inlet 80 is shown as being directly connected to the blower 98, it is also possible that the air inlet could be formed in other ways to produce a desired pressurized air stream, which will be discussed further below. The air outlet 82 is shown as being an internal conduit which includes a long wall 104 and a short wall 106 that both extend in a direction parallel to the drive chain 84. As can be seen, the internal conduit 82 can include an exhaust port 108 that is directed and extends out of the housing 74 so that any material forced through the exhaust port 108 will be expelled out of the agricultural harvester 10. The exhaust port 108 is omitted from being shown in FIG. 2 for ease of illustration. The long wall 104 and short wall 106 of the internal conduit 82 define a channel 110 therebetween that leads to an opening 112 of the exhaust port 108. The long wall 104 has a greater length than the short wall 106, which forms an entrance 114 to the channel 110 at the end of the short wall 106 where crop material is able to be pushed into the internal conduit 82 by the pressurized air stream 100 of the blower 98. The channel 110, which is defined by the overlap between the long wall 104 and short wall 106, can have a relatively long length so that grain material inadvertently blown into the channel 110 by the pressurized air stream 100 can be prevented from bouncing into the opening 112 of the exhaust port 108 and will instead drop down to a baffle 116 at a bottom of the long wall 104 and be returned to a paddle 88 to be conveyed toward the top 86 of the housing 74. As shown in FIG. 5, the channel 110 can connect to multiple exhaust ports 108 that are located on opposite sides of the housing 74, which can allow for less material expelled into the air outlet 82 to be returned to the paddles 88. Multiple outlets 108 can be used if the capacity of a single outlet 108 impedes the cleaning performance of an elevator blower system. Alternatively, the outlet 108 can be placed on either side of the elevator 60 based on constraints of other components' positions relative to the elevator 60.

The housing 74 can have a throwing section 118 defined therein that is adjacent to the boot portion 78 where grain that is being vertically lifted by the paddles 88 is "thrown" as it leaves the boot portion 78. The throwing effect that occurs in the throwing section 118 is caused by the travel of the grain on the paddles 88 through the boot portion 78. As previously described, the boot portion 78 has a semi-circular shape to allow for the paddles 88 to transition from a vertically downward motion to a vertically upward motion in the boot portion 78. Grain is conveyed into the elevator 60 through the inlet 76. Due to the acceleration of the paddles 88 traveling around the sprocket 90, the grain that is conveyed through the boot portion 78 is thrown off of the leading edge 94 of the paddle 88. In some instances, the throwing action is so great that the grain will impact the lagging edge 96 of the paddle 88. Regardless of the aggressiveness of the throwing action, the grain located in the throwing section 118 has a lower packing density, due to the throwing action. While the clean grain is suspended in the air, and shortly thereafter, it has a lowered packing density, compared to other times that the clean grain is travelling through the elevator 60, that allows for the pressurized air stream 100 to remove light particles, such as chaff. The pressurized air stream 100 can be directed toward the internal conduit 82 where this suspension occurs in the throwing section 118. The blower 98 can therefore be configured so that it produces a pressurized air stream 100 that is sufficiently strong to expel lighter particles, such as chaff or straw, into the internal conduit 82 while it is thrown but not strong enough to expel heavier particles, such as grain, into the internal conduit 82. The pressurized air stream 100 can then carry the expelled particles through the internal conduit 82 to the exhaust port 108 to be removed from the agricultural harvester 10. After the clean grain is thrown, gravity and the upward vertical motion of the paddles 88 will cause the clean grain to settle on the leading edge 94 of a paddle 88, returning the clean grain to a higher packed density and making a pressurized air stream contacting the clean grain less effective at removing lighter particles. The length and location of the throwing section 118 can vary based on the paddle 88 to paddle 88 clearance on the drive chain 84, the length of the boot portion 78, the linear velocity of the paddles 88, the dryness of the clean grain, and other factors. The throwing section 118 can be, for example, a section of the elevator 60 that begins at an end 120 of the boot portion 78, which can be described as the area of the housing 74 where the housing 74 transitions from a curved shape to a linear shape, and extends approximately 250 mm up the housing 74 toward the top 86 of the housing 74. Such a throwing section can be defined for an elevator that has a paddle to paddle clearance of 160 mm along the drive chain 84, and is given only as an example and not intended to limit the scope of the invention.

While the pressurized air stream 100 is shown in FIGS. 3-4 as being blown across the paddles 88 directly toward the air outlet 82, it is contemplated that other embodiments could have the pressurized air stream 100 directed toward the air outlet 82 in different directions. The blower 98 can also be adjusted to provide different pressurized air streams 100 to expel lighter particles into the air outlet 82.

Figure 6:
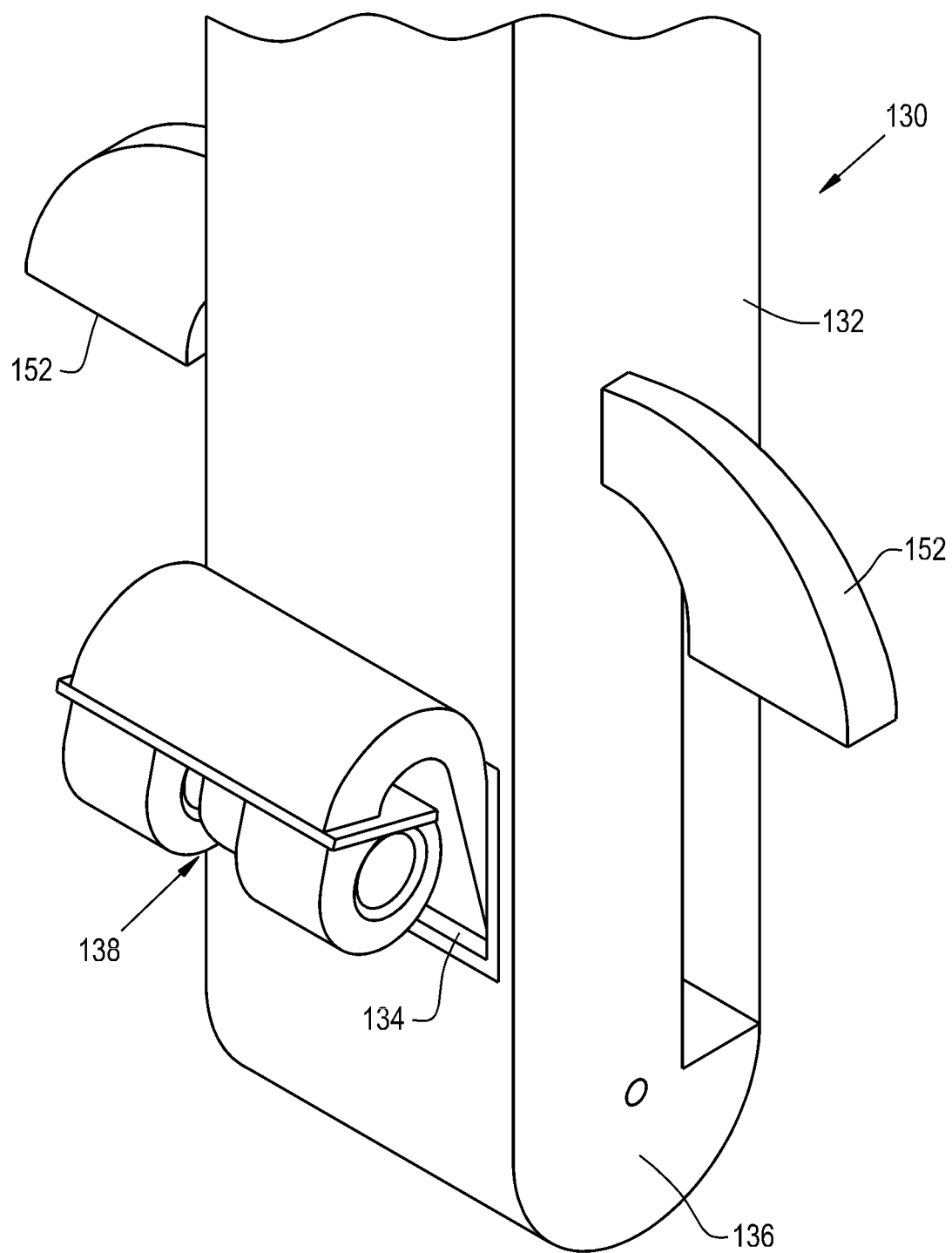
FIG. 6 is a perspective view of another embodiment of an elevator that can be included on the agricultural harvester shown in FIG. 1.
Figure 7:
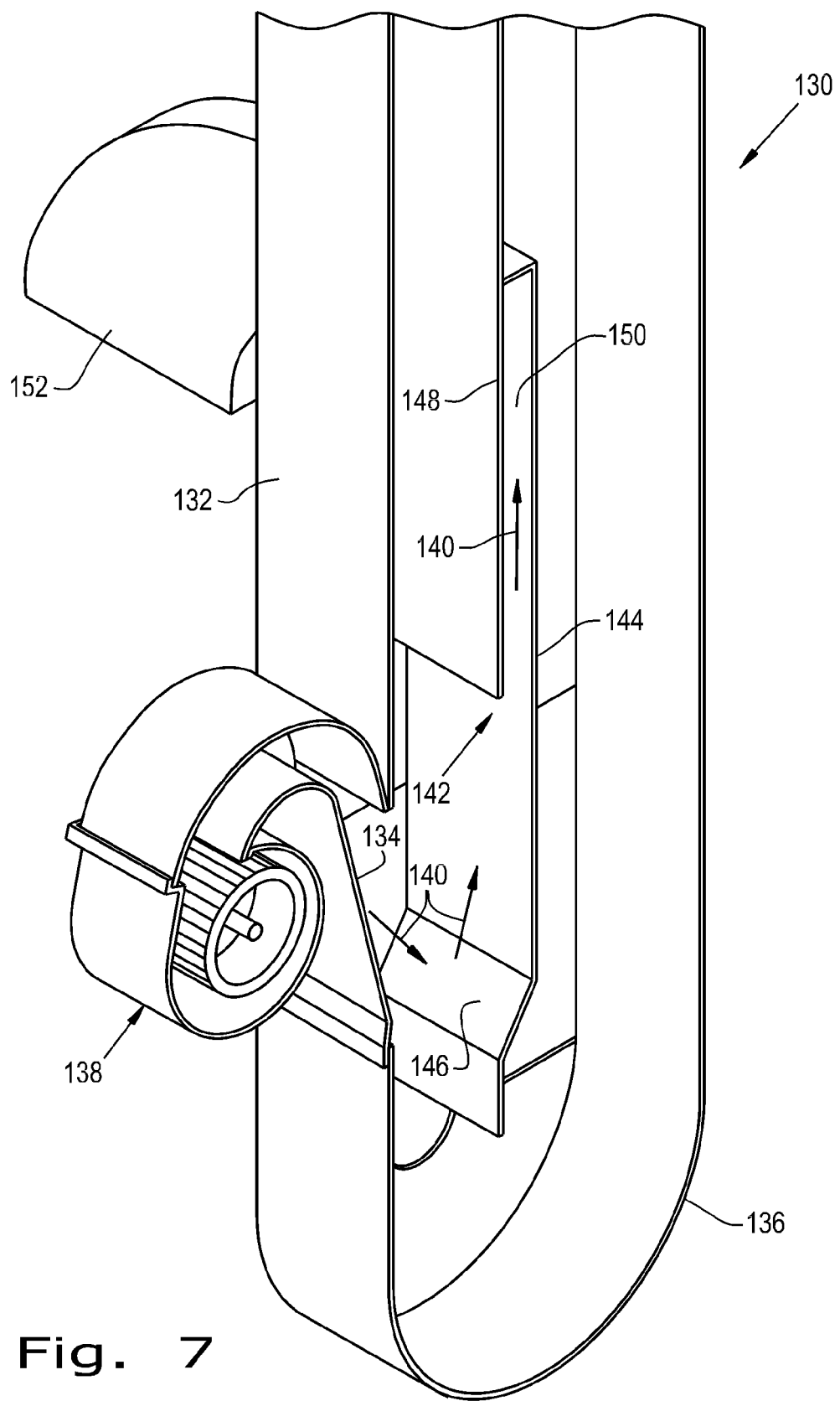
FIG. 7 is a cutaway perspective view of the housing and blower of the elevator shown in FIG. 6.

Referring now to FIGS. 6-7, another embodiment of an elevator 130 according to the present invention is shown. Specifically, the elevator 130 shown in FIGS. 6-7 has a housing 132 with an air inlet 134 that is directed toward a boot portion 136, which forms a bottom of the housing 132, and a blower 138 attached to the air inlet 134 that includes two coupled fans to provide a pressurized air stream, shown as arrow 140, that is directed at an angle downward toward the boot portion 136. As can be seen in FIG. 7, the air stream 140 is directed toward an air outlet 142 that is an internal conduit including a long wall 144 with a baffle 146 and a short wall 148. The baffle 146 is angled such that the pressurized air stream 140 is directed along the surface of the baffle 146 toward the air outlet 142. A channel 150 is defined between the long wall 144 and short wall 148 that is directed to exhaust ports 152 that are directed out of the housing 132. The pressurized air stream 140 is directed toward the baffle 146 so that the air stream 140 can be re-directed up into the channel 150 and exhaust ports 152. As the clean grain is thrown coming out of the boot portion 136, the pressurized air stream 140 can direct the lighter particles, as described above, against the baffle 146 or long wall 144 and expel the lighter particles into the channel 150 and to the exhaust ports 152 to exit the agricultural harvester 10. In this respect, the channel 150 length can allow for grain, which is heavier than chaff, that is inadvertently expelled toward the exhaust ports 152 to be returned to the paddles 88 and be conveyed toward the top 86 of the housing 74.

Figure 8:
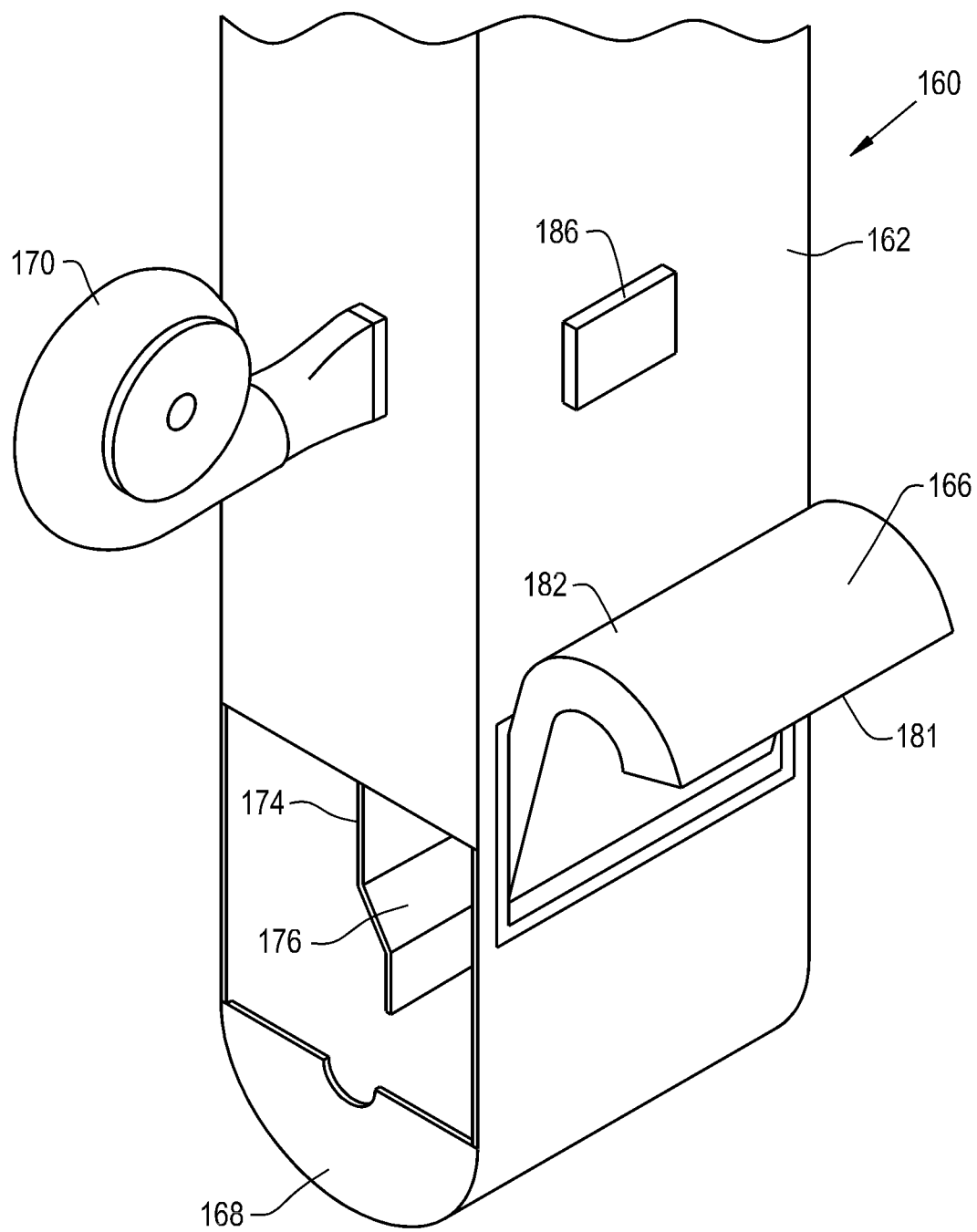
FIG. 8 is a cutaway perspective view of yet another embodiment of a housing and blower of an elevator that can be included on the agricultural harvester shown in FIG. 1.
Figure 9:
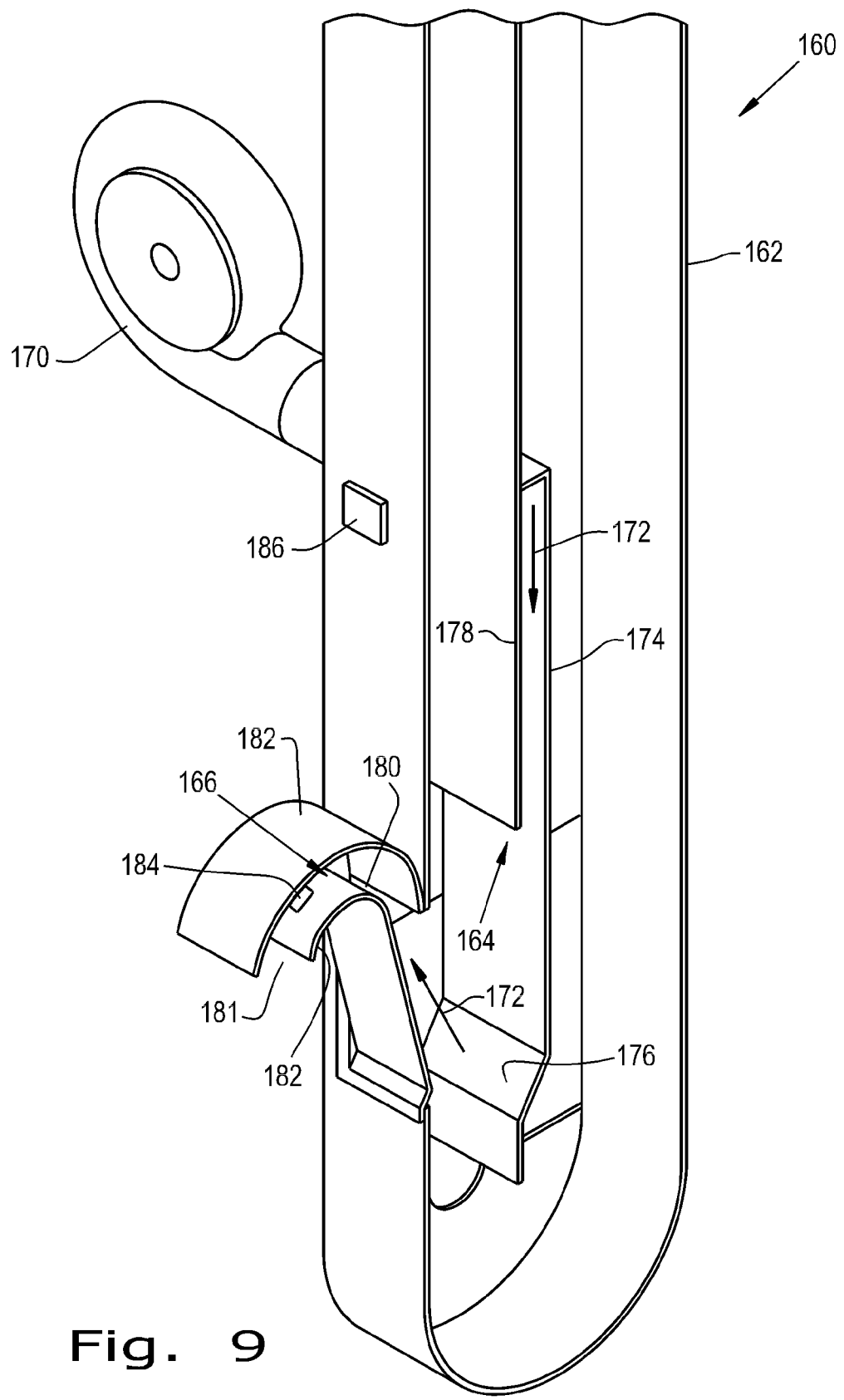
FIG. 9 is a cutaway perspective view of the housing and blower of the elevator shown in FIG. 8.

Referring now to FIGS. 8-9, yet another embodiment of an elevator 160 according to the present invention is shown. Specifically, the elevator 160 shown in FIGS. 8-9 has a housing 162 with an air inlet 164 that is located above an air outlet 166, relative to a boot portion 168 forming a bottom of the housing 162. A blower 170 is attached to the air inlet 164 to direct a pressurized air stream, denoted as arrow 172, toward the air outlet 166 to expel loose particles, such as chaff, toward the air outlet 166 as the loose particles are conveyed away from the boot portion 168. This embodiment of the elevator 160 is similar to the embodiment of the elevator 130 shown in FIGS. 6-7, with the location of the blower 138 being moved to where the exhaust port 152 was located. In this sense, the air inlet 134 referenced in FIGS. 6-7 is the air outlet 166 shown in FIGS. 8-9 and the air outlet 142 referenced in FIGS. 6-7 is the air inlet 164. As can be seen, the pressurized air stream 172 is directed down the air inlet 164, which is formed as an internal conduit having a long wall 174 with baffle 176 and a short wall 178, toward the baffle 176 which directs the pressurized air stream 172 toward the air outlet 166. The pressurized air stream 172 is directed so that it can expel loose particles, such as chaff, toward the air outlet 166 and out the agricultural harvester 10. The air outlet 166 can be formed as a duct that connects to the housing 162 and a channel 180 is defined between a pair of duct walls 182 and is directed out of the agricultural harvester 10. The channel's 180 width can be adjusted by changing the distance between the duct walls 182 to form a duct 166 with a channel that does not allow larger, heavier particles such as grain from passing through while allowing smaller, lighter particles such as chaff to pass through. The channel's 180 length can also be adjusted to reduce the amount of grain that is inadvertently expelled out of the agricultural harvester 10. The channel 180 can lead to an opening 181 that is directed out of the agricultural harvester 10 to expel any crop material that passes through the channel 180 out of the agricultural harvester 10.

Optionally, a grain sensor 184 can be placed in any of the previously described air outlets, such as air outlet 166 shown in FIGS. 8-9, that can sense an amount of grain that is inadvertently expelled out of the agricultural harvester. The grain sensor 184 can be any type of sensor that is able to differentiate between grain and chaff, such as an optical sensor configured to recognize size differences between particles that pass by or a pressure sensor that is configured to recognize different sized particles hitting the sensor. The grain sensor 184 can be placed in a section of the air outlet 166 where it is almost assured that the grain will be expelled from the agricultural harvester 10, such as near opening 181, or could be placed near an entrance of the air outlet 166 to determine how much grain enters the air outlet 166. The grain sensor 184 can be coupled to a controller 186 that can also be coupled to a blower, such as blower 170. The grain sensor 184 can send signals to the controller 186 that are interpreted to determine how much grain is inadvertently expelled into or out of the air outlet 166. The controller 186 can be pre-programmed to respond to a predetermined unacceptable level of inadvertent grain expulsion by reducing the power supplied to the blower 170, reducing the force that the pressurized air stream 172 provides to expel loose crop material into the air outlet 166. The reduction in power to the blower 170 could reduce the amount of grain that is inadvertently expelled out the agricultural harvester 10. The controller 186 can also be coupled to a display (not shown) that can alert a user to the amount of grain that is inadvertently expelled out the agricultural harvester 10, which might prompt the user to turn off the blower 170 manually.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural harvester, comprising:
   a chassis;
   at least one ground engaging traction member connected to said chassis;
   a cleaning system held by said chassis and configured to clean crop material; and
   an elevator supplied with the crop material cleaned by said cleaning system, said elevator including:
      a housing having a crop material inlet that receives the crop material, a boot portion that forms a bottom of said housing, an air inlet and an air outlet;
      a plurality of paddles configured to convey the crop material through said housing and away from said boot portion in a generally vertical direction; and
      a blower configured to produce a pressurized air stream through said air inlet that expels loose crop material into said air outlet as the crop material is conveyed away from said boot portion.
2. The agricultural harvester according to claim 1, wherein said housing has a throwing section adjacent to said boot portion where the pressurized air stream is directed toward said air outlet.
3. The agricultural harvester according to claim 1, wherein said plurality of paddles convey the crop material in the vertical direction between said air inlet and said air outlet.
4. The agricultural harvester according to claim 3, wherein said air outlet is located downstream of said air inlet in a direction of travel of said plurality of paddles and the pressurized air stream is directed toward said air outlet in a direction away from said boot portion.

5. The agricultural harvester according to claim 4, wherein said air outlet is an internal conduit with a pair of conduit walls extending parallel to said direction of travel of said plurality of paddles.

6. The agricultural harvester according to claim 5, wherein said internal conduit has an exhaust port that is directed outside of said housing.

7. The agricultural harvester according to claim 5, wherein said pair of conduit walls includes a long wall and a short wall, said long wall being in line with the pressurized air stream and said short wall not being in line with the pressurized air stream.

8. The agricultural harvester according to claim 3, wherein said air outlet is an internal conduit having a short wall and a long wall, the pressurized air stream being directed toward said long wall in a direction toward said boot portion.

9. The agricultural harvester according to claim 8, wherein said air outlet includes at least one exhaust port directed outside of said housing.

10. The agricultural harvester according to claim 3, wherein said air inlet is an internal conduit having a short wall and a long wall, said long wall including a baffle.

11. The agricultural harvester according to claim 10, wherein said baffle directs the pressurized air stream toward said air outlet.

12. The agricultural harvester according to claim 11, wherein said air outlet is an exhaust port directed outside of said housing.

13. The agricultural harvester according to claim 1, further comprising:
   a grain sensor located in said air outlet; and
   a controller coupled to said grain sensor and configured to determine an amount of grain that is expelled into said air outlet.

14. The agricultural harvester according to claim 13, wherein said air controller is coupled to said blower and configured to reduce an amount of power supplied to said blower when the amount of grain expelled into said air outlet exceeds a predetermined level.

15. The agricultural harvester according to claim 1, wherein said blower is an air compressor that is linked to a controlled and pulsated air nozzle.

16. A crop material elevator, comprising:
   a housing including a crop material inlet, a boot portion forming a bottom of said housing, a top, an air inlet and an air outlet;
   a driving loop held within said housing that extends from said boot portion toward said top of said housing;
   a plurality of paddles connected to said driving loop and configured to convey crop material away from said boot portion toward said top of said housing; and
   a blower configured to produce a pressurized air stream through said air inlet that expels loose crop material into said air outlet as the crop material is conveyed away from said boot portion.

17. The crop material elevator according to claim 16, wherein said housing has a throwing section adjacent to said boot portion where the pressurized air stream is directed toward said air outlet.

18. The crop material elevator according to claim 16, wherein said drive chain is held between said air outlet and the pressurized air stream.

19. The crop material elevator according to claim 18, wherein said air outlet is an internal conduit having a pair of conduit walls that extend parallel with said drive chain.

20. The crop material elevator according to claim 19, wherein said internal conduit includes an exhaust port that is directed outside of said housing.

\* \* \* \* \*